US009709421B2

United States Patent
Blackwell et al.

(10) Patent No.: US 9,709,421 B2
(45) Date of Patent: *Jul. 18, 2017

(54) METHOD AND SYSTEM FOR PROVIDING WEB-ENABLED CELLULAR ACCESS TO METER READING DATA

(71) Applicant: Badger Meter, Inc., Milwaukee, WI (US)

(72) Inventors: Morrice D. Blackwell, Mequon, WI (US); Randall L. Schultz, Fredonia, WI (US); Yarum Locker, Givat Shmuel (IL)

(73) Assignee: Badger Meter, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,272

(22) Filed: Feb. 3, 2014

(65) Prior Publication Data

US 2014/0320304 A1 Oct. 30, 2014

Related U.S. Application Data

(63) Continuation of application No. 12/572,432, filed on Oct. 2, 2009, now Pat. No. 8,644,804.

(51) Int. Cl.
*G01D 4/00* (2006.01)
*H04L 29/08* (2006.01)

(52) U.S. Cl.
CPC ........ *G01D 4/002* (2013.01); *H04L 67/025* (2013.01); *H04L 67/125* (2013.01); *H04L 67/2828* (2013.01); *Y02B 90/241* (2013.01); *Y02B 90/243* (2013.01); *Y02B 90/246* (2013.01); *Y04S 20/32* (2013.01); *Y04S 20/325* (2013.01); *Y04S 20/42* (2013.01)

(58) Field of Classification Search
CPC .............................. G01D 4/002; H04L 67/025
USPC .................... 340/870.02, 870.03; 455/414.1
See application file for complete search history.

(56) References Cited

U.S. PATENT DOCUMENTS

| | | | | |
|---|---|---|---|---|
| 2002/0193144 A1* | 12/2002 | Belski et al. | ................ | 455/557 |
| 2005/0033534 A1* | 2/2005 | Villicana et al. | ............... | 702/61 |
| 2005/0033701 A1* | 2/2005 | Challener et al. | .............. | 705/63 |
| 2005/0172279 A1* | 8/2005 | Cook et al. | ................... | 717/162 |
| 2005/0237959 A1* | 10/2005 | Osterloh et al. | ............. | 370/310 |
| 2007/0284293 A1* | 12/2007 | Pitchford et al. | .............. | 210/85 |
| 2008/0114880 A1* | 5/2008 | Jogand-Coulomb et al. | ............................ | 709/227 |
| 2008/0320577 A1* | 12/2008 | Larduinat | ......................... | 726/9 |

(Continued)

*Primary Examiner* — Nathan Mitchell
(74) *Attorney, Agent, or Firm* — Boyle Fredrickson, S.C.

(57) ABSTRACT

A method and a system for collection of meter readings from meter reading and transmitting devices (12, 14) and for viewing on a web-enabled wireless communication device (28) comprises addressing at least one receiver (15) through the Internet (21) and obtaining a data file of meter data for a plurality of meter reading devices (12, 14) that have previously communicated with the receiver (15). The receiver (15) can then re-transmit the meter data through a wide area network such as the Internet (21) to a web site (10) operated by an organization marketing AMR systems. The meter data is then accessed and displayed at a customer demonstration site using a handheld wireless smart phone (28) which receives a web page (22) that is reduced in size for transmission through the cellular network to the smart phone (28).

19 Claims, 2 Drawing Sheets

(56) References Cited

U.S. PATENT DOCUMENTS

2009/0146838 A1* 6/2009 Katz ..................... 340/870.02
2009/0224940 A1* 9/2009 Cornwall ............... 340/870.03
2010/0117857 A1* 5/2010 Russell et al. ......... 340/870.02
2010/0188257 A1* 7/2010 Johnson ................ 340/870.02

* cited by examiner

METHOD AND SYSTEM FOR PROVIDING WEB-ENABLED CELLULAR ACCESS TO METER READING DATA

This application is a continuation of U.S. application Ser. No. 12/572,432, filed Oct. 2, 2009, the disclosure of which is hereby incorporated by reference herein.

TECHNICAL FIELD

This invention relates to automatic meter reading (AMR) systems using radio transmitters and receivers for collecting meter data signals over a geographical area, such as a municipality or utility district.

DESCRIPTION OF THE BACKGROUND ART

Fixed network (non-mobile) AMR (automatic meter reading) systems typically involve meters equipped with radio transmitters operating in a local area network with radio receivers, often mounted on a rooftop or a utility pole. The receivers also sometimes operate as gateways, for collecting meter data from the transmitters and then transmitting the meter data through a second network to a central office. The meter data is transmitted from the receivers or gateways to the central office for processing into customer statements of account. Typically, there is at least a network communications computer and an applications computer at the central office of the local utility, although various systems at the collection end are possible and are known in the art.

In the prior art, installing an AMR system included the setting up of a central office data collection system and a database for the meter data.

In the marketing of AMR systems, it would be advantageous to demonstrate the collection of meter reading data before actual installation of the central office data collection system. Prospective customers could then see how the system would work prior to contracting for installation of a large system.

SUMMARY OF THE INVENTION

The invention provides a method and a system for collection of meter readings from meter reading and transmitting devices and for viewing meter data on a web-enabled wireless communication device.

The method comprises addressing at least one receiver through a wide area network, preferably the Internet, to obtain meter data from at least one and usually a plurality of meter reading devices that have previously communicated with the receiver. The receiver can then re-transmit the meter data to a web site operated by the organization marketing AMR systems. The data is then be accessed from a customer demonstration site, preferably using a wireless communication device.

The method and system of the present invention can run on a web site that can be reached through a GSM or other cellular network. The method of the invention further includes reading a file of meter data in the form of an HTML web page, which is then modified for viewing on a web-enabled handheld wireless communication device.

The wireless communication device is preferably a web-enabled wireless communication device, such as a Blackberry web-enabled cellular phone, another web-enabled cellular phone or personal digital assistant (PDA). In alternative embodiments, the web-enabled wireless communication device can also be a laptop with wireless Internet capability, but a handheld wireless processor-based device is considered advantageous and is strongly preferred for convenience and portability.

The invention provides a demonstration tool that can be operated at a customer demonstration site by a sales person as part of a customer presentation without requiring assistance from engineering personnel as practiced in the prior art. The use of a Web application on a web-enabled telephone simulates collection of data at a utility collection site. This will demonstrate the capabilities of the AMR-networked system prior to purchase by utility customers and installation at their premises.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
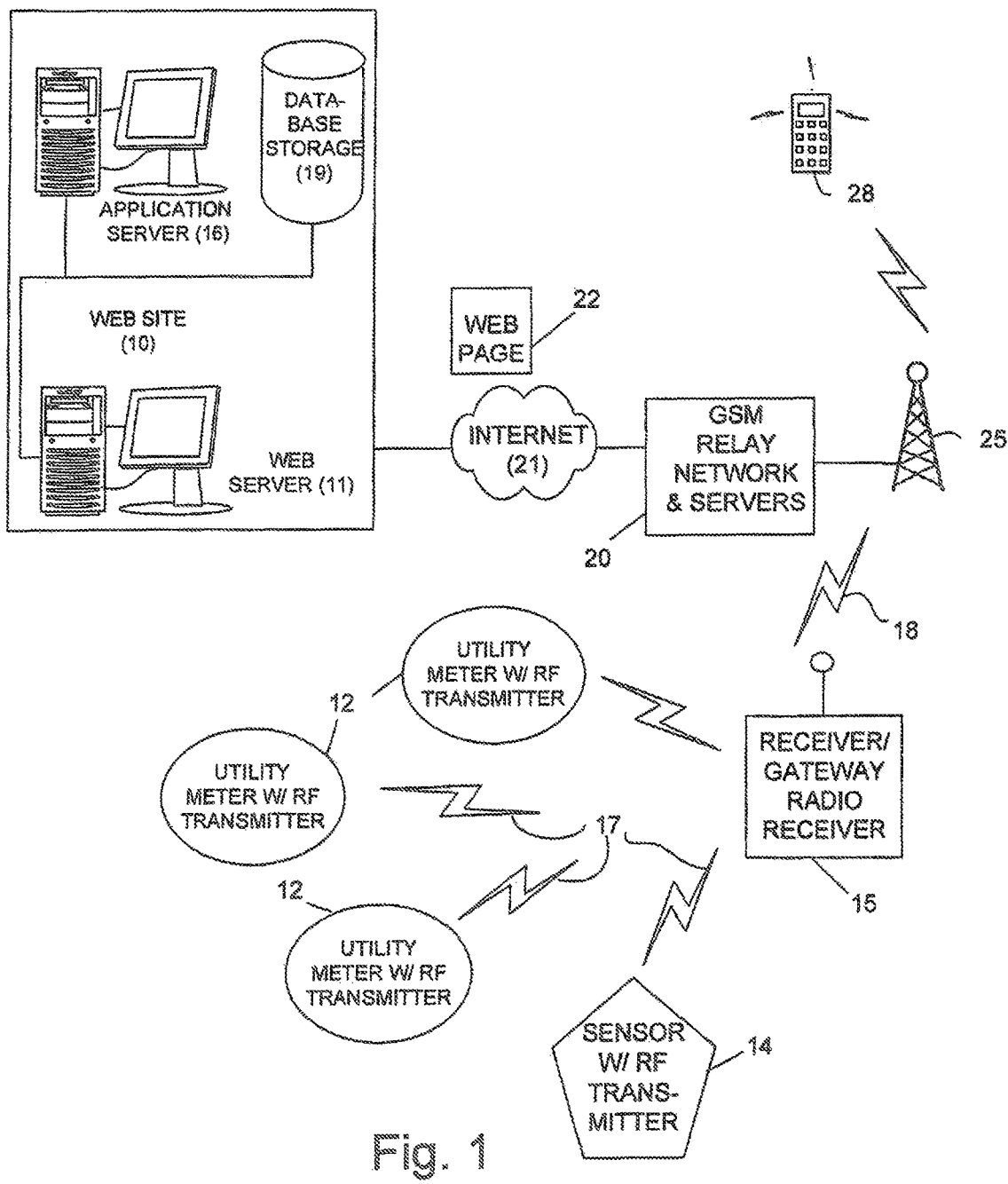
FIG. 1 is a schematic of a fixed-network AMR system for collecting meter data from transmissions from meter data reading devices and making the data available through a web-enabled cellular device.

Referring to FIG. 1, a network gateway receiver 15 is installed on a roof top (not shown) or on a utility pole (not shown). In this preferred embodiment, the utility is water, however, in other embodiments the utility can be gas or electricity.

A plurality of meter reading devices 12 each include a utility meter, a transducer and an RF (radio frequency) transmitter. In this example, the units 12 can be meter reading and transmitting units commercially offered under the Orion® trademark or the Galaxy® trademark by the assignee of the present invention. These meter reading devices 12 transmit radio frequency (RF) signals 17 to the receiver 15 to form a local area wireless network. It should be understood that there is typically more than one receiver 15 in a network, although only one is illustrated in FIG. 1. Sometimes the receiver 15 is also referred to as a "gateway" because it interfaces between the local area wireless network and another longer range network 21. Alternatively, the meter reading devices 14 may be sensors for sensing other types of conditions at the utility meter or in supply links connected to the utility meters. These sensors may be connected to Orion® or Galaxy® radio transmitters to transmit status data to the receiver 15.

The meter reading devices 12, 14 read meter data and certain alarm/condition status data from the meters. As used herein, the term "meter data" should be understood to include either utility consumption data or condition status data, or both. Condition status data includes leak detection data, tamper data and shut-off valve data and other types of data concerning meter operation besides actual utility consumption data.

The devices 12, 14 transmit data-encoded RF signals over low power RF frequencies either in the non FCC-licensed ISM (Industrial-Scientific-Medical) band from 902 MHz to 928 MHz or in the FCC-licensed frequencies such as 150-200 Mhz, 325 MHz, 433.92 MHz or from 450 to 470 MHz.

The meter data transmitters 12, 14 transmit to an RF receiver 15, which in this case is a Galaxy® receiver offered by the assignee of the present invention. The receiver 15 is provided with wireless capability to re-broadcast transmissions to a GSM cellular tower 25, a GSM network 20 and the Internet 21 to a GSM-networked web site 10. This web site 10 includes a web server 11 for handling communications in both directions through the Internet 21, and an applications server 16 for handling the content of pages for communication and display through the Internet 21. The applications server 16 also stores and accesses data in a database stored in a database storage unit 19. The database stores a receiver network address, a list of transmitting devices 12, 14 served by the receiver 15, a history of readings for the transmitting devices 12, 14 and a history of readings from the receiver 15. It should be mentioned here that many architectures are available for web sites using additional servers and these are within the scope of the present invention.

The web site 10 will store the meter data in web pages 22 that can be accessed at an Internet Protocol (IP) addresses having the format XXX.YY.ZZZ, where X, Y and Z are individual numbers from "0" to "9" or preferably at a domain name/URL address of the form http://www.(name).(domain)/where "(name)" is the site identifier and "(domain)" is a domain such as .com or .(country).

These web pages can be accessed through a GSM relay network and servers 20 that can convert HTML pages to web pages of a type that can be displayed on the visual display portion of a wireless handheld device, such as a Blackberry™ smart phone, as disclosed in U.S. Pat. No. 7,302,637, issued Nov. 27, 2007, the disclosure of which is incorporated here by reference.

The web site 10 will have its own distinctive domain name or IP address. It can be maintained by the marketing organization or a hosted by a third party on behalf of the marketing organization.

An application program is provided on the handheld wireless device 28 to access the web site 10 and obtain a reduced size version of the web page 22 through the GSM relay network and servers 20.

When accessed by a user of the handheld device 28, a log-in screen will appear prompting the user to enter a user name and a password. After logging in, the user will have an option to select a "Monitor mode or a Data View" mode. A search screen will also be available to allow the user to find the data for a specific transmitter. The web site 10 is addressed and a web page 22 of data is transmitted from the web site 10 to the web-enabled wireless device 28 through the Internet 21 and is converted to a reduced size web page as the web page 22 is transferred through the GSM relay network and servers 20. On the handheld device 28, a reduced size "Monitor" web page 22 will display the last transmissions that were received by the receiver/gateway 15 from the meter/transmitters 12. The data displayed on the "Monitor" web page will include the transmitter number, the time of reception and an indication of signal strength (by a graphic representation of the RSSI). By selecting a line on the screen display of the web-enabled wireless device, the user can cause a display of a history of daily transmissions received from a specific transmitter.

Figure 2:
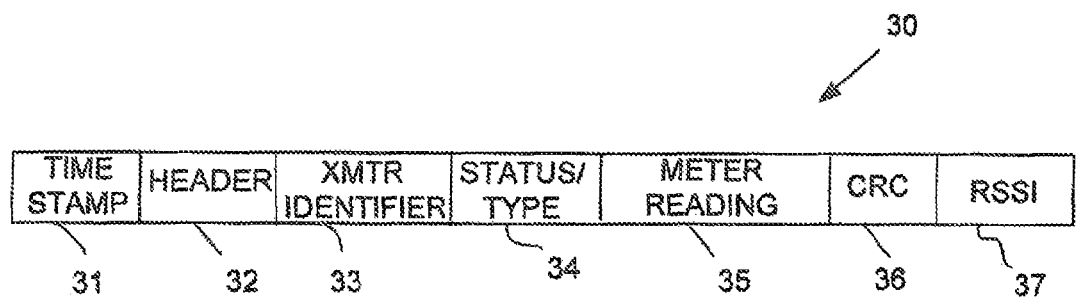
FIG. 2 is a data map of data received from the meter reading devices.

The data is preferably displayed in a WAP format supported by web-enabled smart phone devices such as a Blackberry™ smart phone. Each line of data contains data received from one of the transmitters. FIG. 2 shows a map of each line of data 30 in a web page 22. There is a first item of data 31 which is a time stamp for the individual meter reading device 12, 14. Next, there is a header 32. This is followed by an item of data 33 representing the identifier, such as a serial number of the transmitter which corresponds to each meter reading device 12, 14. Next, there is a status or type item of data 34 which identifies one of several types meter reading devices 12, such as an RTR® pulse register/transmitter type, an ADE® digital encoder type, or gas meter registers, or other designations for completely electronic registers. This is followed by the actual meter data or status condition data, as represented by item 35. This is followed by a CRC item of data 36, which is a cyclic redundancy code or error checking code computed from the data earlier in line of data. Finally, a radio signal strength indicator (RSSI) item of data 37 is provided from each meter reading device 12, 14 for radio network diagnostics purposes.

As seen from the above description, the invention provides for easier demonstration of the data collection abilities of an AMR system on a handheld wireless processor-based device, thereby saving labor and installation cost and providing ease of use to the marketing organization and the utility customer.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A method for collection of meter data through a wide area network from at least one receiver communicating in a local network with at least one meter reading device in a geographic area, the method comprising:
   receiving meter data generated by a utility meter and provided to a meter reading device, the meter data including both utility consumption data readings and condition status data generated by the utility meter, through the wide area network at a web site from a receiver that received the meter data from the meter reading device;
   storing the meter data at the web site; and
   accessing the meter data at the web site using a wireless communication device and displaying the meter data on a display portion of the wireless communication device, wherein the condition status data includes at least one of leak detection data, tamper data, radio signal strength, and shut-off valve data.

2. The method of claim 1, wherein the meter data is accessed by an application program on the wireless communication device that displays the meter data as a reduced size web page.

3. The method of claim 2, wherein the wireless communication is a handheld web-enabled phone device.

4. The method of claim 3, wherein the handheld web-enabled phone device communicates through a GSM cellular network.

5. The method of claim 2, wherein the meter data is received at the web site as an HTML web page and is stored at the web site.

6. The method of claim 5, wherein the wide area network is the Internet.

7. The method of claim 1, wherein the meter reading devices include devices for reading condition status data related to a meter or to supply links connected to the meter, and wherein the meter data includes condition status data.

8. A system for displaying meter reading data collected from at least one reading device in a geographic area, the system comprising:

a computer server implementing a web site for receiving and storing a data file through a wide area network from the at least one receiver that includes meter reading data, including both utility consumption data readings from the utility meter and condition status data, from a plurality of meter reading devices; and a web-enabled cellular phone executing an application program for the web-enabled cellular phone for displaying condition status data and utility consumption data readings communicated from the web site accessible through a cellular network, wherein the condition status data includes at least one of leak detection data, tamper data, radio signal strength, and shut-off valve data.

9. The system of claim 8, wherein the application program displays the meter data as a reduced size web page on a display portion of the web-enabled cellular phone.

10. The system of claim 8, wherein web-enabled cellular phone communicates through a GSM cellular network.

11. The system of claim 8, wherein the meter data is received at the web site as an HTML web page and is stored at the web site.

12. The system of claim 11, wherein the wide area network is the Internet.

13. The system of claim 8, wherein the meter reading devices include devices for reading condition status data related to a meter or to supply links connected to the meter, and wherein the meter data includes condition status data.

14. A method for collection of meter data through a wide area network from at least one receiver communicating in a local network with at least one meter reading device in a geographic area, the method comprising:

receiving data through the wide area network at a web site from the at least one receiver that includes meter data generated by a utility meter and provided via a meter reading device to the at least one receiver, the meter data including both utility consumption data readings and condition status data generated by the utility meter;

receiving a request to display the meter data at the web site from a wireless communication device; and transmitting the meter data for display on a display portion of the wireless communication device, wherein the utility consumption data readings are meter readings for at least one meter reading device that have been transmitted at a defined time interval, wherein receiving a request to display the meter data at the web site from a wireless communication device includes selection of a link displayed on a web page specific to the at least one meter reading device.

15. The method of claim 14, wherein the meter data is displayed on the display portion as a reduced size web page.

16. A method for collection of meter data through a wide area network from at least one receiver communicating in a local network with at least one meter reading device in a geographic area, the method comprising:

receiving data through the wide area network at a web site from the receiver that includes meter data from at least one meter reading device;

receiving a request to display the meter data at the web site from a wireless communication device; and transmitting the meter data for display on a display portion of the wireless communication device, wherein the meter data includes a plurality of meter readings for at least one meter reading device that have been transmitted at a defined time interval, wherein the meter data includes an indication of signal strength.

17. The method of claim 16, wherein the indication of signal strength includes an indication of signal strength for each defined time interval.

18. The method of claim 17, wherein the defined time interval is daily.

19. A method for collection of meter data through a wide area network from at least one receiver communicating in a local network with at least one meter reading device in a geographic area, the method comprising:

receiving data through the wide area network at a web site from the receiver that includes meter data generated by a utility meter and provided via a meter reading device to the at least one receiver, the meter data including both utility consumption data readings and condition status data generated by the utility meter;

receiving a request to display the meter data at the web site from a wireless communication device; and transmitting the meter data for display on a display portion of the wireless communication device, wherein the utility consumption data readings are meter readings for at least one meter reading device that have been transmitted at a defined time interval, wherein the at least one meter reading device includes a least one device for reading condition status data related to a meter or to supply links connected to the meter, and wherein the meter data includes condition status data.

* * * * *